W. A. LENZ.
PHOTOPRINT WASHER.
APPLICATION FILED DEC. 21, 1918.
1,313,395.
Patented Aug. 19, 1919.
2 SHEETS—SHEET 1.
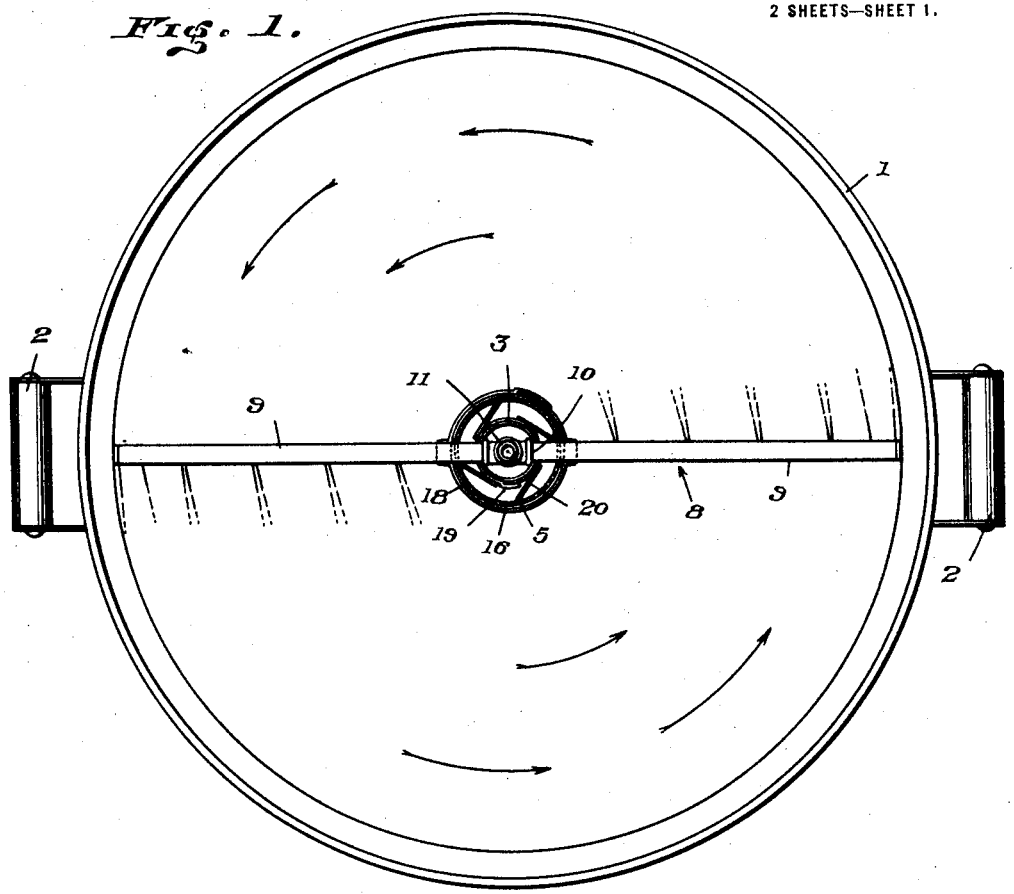
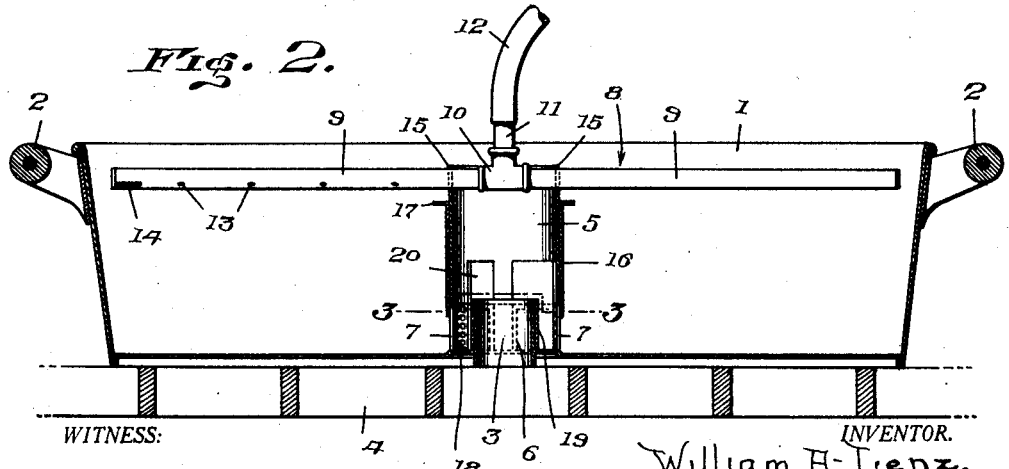
WITNESS:
INVENTOR.
William A. Lenz,
BY
W. J. Fitz Gerald & Co.
ATTORNEYS.

W. A. LENZ.
PHOTOPRINT WASHER.
APPLICATION FILED DEC. 21, 1918.
1,313,395.
Patented Aug. 19, 1919.
2 SHEETS—SHEET 2.
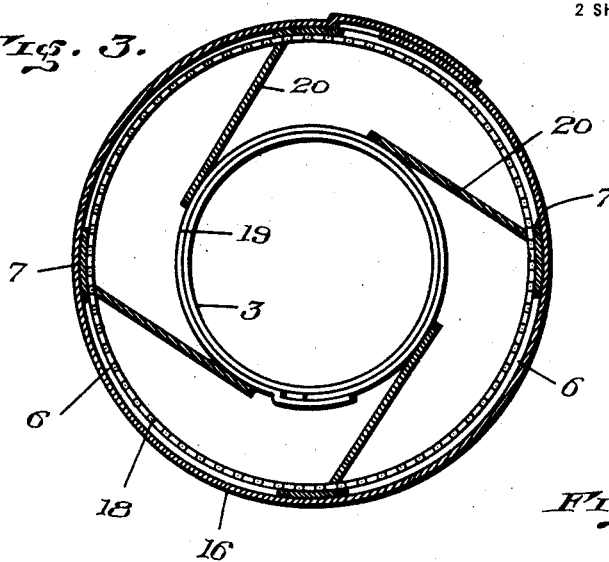
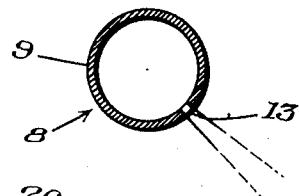
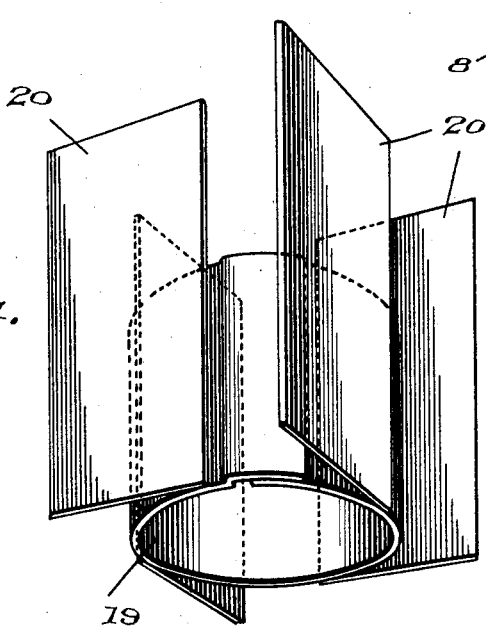
WITNESS:
INVENTOR.
William A. Lenz,
BY
ATTORNEYS.

UNITED STATES PATENT OFFICE.

WILLIAM A. LENZ, OF LEBANON, MISSOURI.

PHOTOPRINT-WASHER.

1,313,395.   Specification of Letters Patent.   Patented Aug. 19, 1919.

Application filed December 21, 1918.   Serial No. 267,804.

*To all whom it may concern:*

Be it known that I, WILLIAM A. LENZ, a citizen of the United States, residing at Lebanon, in the county of Laclede and State of Missouri, have invented certain new and useful Improvements in Photoprint-Washers; and I do hereby declare the following to be a full, clear, and exact description of the invention, such as will enable others skilled in the art to which it appertains to make and use the same.

The present invention relates to certain new and useful improvements in washers for washing and rinsing photographic prints and other sheets of material, and it is the object of the invention to provide a device of that character having novel and improved features of construction to enhance utility and efficiency thereof.

The present device is designed to automatically do the work of eliminating, or washing off, the chemicals from the prints or sheets after they have been fixed or treated, such as in a hypo-solution, the principal ingredient of which is sodium thiosulfate, although the machine can be used for washing off or rinsing various objects.

The primary object of the invention is to improve in several particulars the print washers now in use, so that the solution may be removed from the prints quicker, more thoroughly, with greater certainty, in less time and with less attention on the part of the operator.

The washer is also constructed in a simple and compact manner, so that the operator has full access to any part at any time, and a further object is the provision of novel means whereby the device can be adjusted or regulated for a large or small number of prints, such adjustment being accomplished almost instantly whenever desired, and the device will require no further attention after the water has once been turned on at the proper speed.

A further object of the invention is the provision of such a washer for accomplishing the intended function by the momentum of the water obtained by water under pressure supplied to the washer, such as is usually furnished by a city water system, and the construction and arrangement of parts is such that the force of the water produces the greatest amount of agitation possible from a minimum amount of water, so that the prints will not lodge or stick together, but will be kept continually separated and in motion during the operation, and owing to a constantly changing supply of fresh water, the hypo or other solution is quickly and thoroughly eliminated from every print.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the improved washer.

Fig. 2 is a diametrical section thereof, portions being shown in elevation.

Fig. 3 is an enlarged sectional view taken on the line 3—3 of Fig. 2.

Fig. 4 is a perspective view of the water deflector for the water outlet trap.

Fig. 5 is an enlarged cross section of the water spray pipe.

In carrying out the invention, there is used a tub or pan 1, which is preferably provided at opposite sides with suitable handles 2, for convenience in handling the tub and enabling it to be hung up when not in use. The bottom of the tub is provided at its center with an outlet formed by a collar 3 upstanding from the bottom to a suitable height, and comprising part of the water outlet trap. The water discharges through this outlet member or collar 3 into a receptacle underneath, and a satisfactory way of using the washer is to set the tub 1 on a rack or grid 4, which is in turn seated on a sink or basin. In this way, the water can discharge directly downward from the washer into the sink, although it will be understood that the water discharged from the washer can be conducted to a drain or other receiver by other suitable means.

Disposed centrally within the tub is a cylindrical water trap casing 5, which rises to a greater height than the collar 3, or to a point near the plane of the rim of the tub. The casing 5 surrounds and is concentric with the collar 3, and is provided at its lower end with openings 6, there being four of these as shown, although there may be more or less. Between the openings 6, the casing 5 has legs or standards 7, that are seated on and secured to the bottom of the tub to support the casing in upright position. The openings 6 are of the same height as the water outlet collar or member 3, so that the outlet member and casing 5 form a water trap, it being noted that the water in discharing from the tub must pass from the bottom of the tub inwardly through the openings 6, thence upwardly within the casing 5 between the walls thereof and the member 3, and thence upwardly and inwardly over the rim of the member 3 to discharge downwardly therethrough. This serves to impede the discharge of water, so that the device can be maintained with a desired water level or depth of water in the tub as will hereinafter more fully appear.

The water supplying means comprises a spray pipe 8, which, as shown, is disposed diametrically within the mouth of the tub, and which comprises opposite radial arms 9, having their outer ends closed and their inner ends attached to a T-coupling 10 and nipple 11, projecting upwardly for the attachment of a suitable hose 12, that leads from a water faucet or other source of water under pressure. In this way, water under pressure can be supplied, and the flow controlled by means of the faucet or valve, to regulate the supply and pressure of water delivered into the tub. The spray pipe arms 9 are provided with discharge apertures 13 at spaced points along their lengths, and said arms 9 have outlet slits 14 at their outer ends. These outlet apertures and slits extend downwardly and toward one side of each respective arm, said arms being reversed and the said outlets being at an angle of about 45 degrees, whereby the water sprayed into the tub will be directed downwardly at an angle, discharging in opposite directions from the opposite arms 9, as seen in Fig. 1, so as to give the water within the tub a whirling motion as well as agitating it violently where the streams of water are sprayed into the whirling body of water within the tub. This provides both a whirling and agitation of the water which accomplishes the thorough agitation of the prints to wash and rinse them quickly and effectively, and to keep them separated and in individual suspension. The water which discharges from the apertures 13, will flow in small streams or jets, whereas the water which discharges through the slits 14 will flow in sheets or wide streams, to assure of a more violent agitation at the rim of the tub to avoid the prints sticking or clinging to the walls thereof. The preferred way of supporting the spray pipe 8 is to provide the upper end of the casing 5 with opposite notches 15, in which the arms 9 are seated. This also permits the spray pipe to be readily applied and removed.

In order to control and regulate the discharge of water and to determine the depth or height of water in the tub, according to the number of prints that are being washed and to enable the device to accommodate any number of prints, from a small amount up to a comparatively large batch of prints a shutter or valve sleeve 16 is slidable vertically on the casing 5, and acts as an adjustable water gage. This sleeve 16 is bent from a sheet of metal, so that the sleeve is divided vertically with the vertical edges overlapped, and the sleeve has a contractive tension, whereby it embraces the casing with sufficient tension to hold it in any adjusted position, and will permit the sleeve to be slid upwardly and downwardly, or slid off of the casing by hand. It is preferable to provide the upper end of the sleeve 16 with outturned ears 17 forming handles for convenience in adjusting the sleeve. It will be evident that by moving the sleeve downwardly, its lower end will cover the openings 6 more or less from the top, and the sleeve can thus be set accurately to determine the discharge of water into and through the water outlet trap.

A cylindrical screen 18, preferably bent from a sheet, is fitted within the casing 5 so as to expand therein and extend across the openings 6, thereby preventing the prints from passing into or through the said openings, as would of course be objectionable. This screen extends from the bottom of the tub upwardly above the upper edges of the openings 6, and like the sleeve 16, can be readily slipped from the casing 5 for purposes of cleansing, repair, or replacement.

A water deflector is provided within the water outlet trap to facilitate the discharge of water, and this deflector comprises a band or sleeve 19, similar in formation to the sleeve 16, but of smaller size so as to fit on the member 3 and maintain itself in position, due to the contractive tension of said band which is split vertically and provided with overlapping edges along the split portion. Oblique or tangential wings or deflecting members 20 are soldered or otherwise secured to the band 19, there being preferably one wing 20 to each opening 6. These wings 20 have their outer edges adjacent to the screen 18 behind the legs 7, and said wings extend from the lower edge of the band 19 and bottom of the tub, upwardly to a point above the upper edges of the band 19 and member 3, and above the upper edges of the openings 6. The wings 20 extend toward a direction opposite to the direction in which the water whirls within the tub, so that the water in passing through the opening 6, at the center of the whirlpool, will encounter the wings 20 which will serve to deflect and carry the water from the openings into the trap and upwardly therein, to then gravitate downwardly through the discharge member 3. The water deflector can also be readily removed and applied.

With the washer placed on the rack 4 over a sink, or otherwise disposed for the discharge of water, and the hose 12 connected to a hydrant or faucet, the water is turned on and when it reaches the point that it begins to overflow through the outlet or drain member or pipe 3, the prints are thrown into the tub. The force of the flow of water turned on at the faucet or hydrant, determines the force of the spray and the action of the water in the tub. When turned on sufficiently the water is thrown into the tub with such force that it produces a boiling, swirling whirlpool of water, and this action of the water sets the prints whirling within the tub, and the force of the spray of fresh water as it strikes the prints at or near the surface, keeps the prints agitated and also causes them to be separated and individually suspended. As a result, the prints are quickly freed of the solution thereon, and the solution naturally passes to the bottom of the tub and thence by centripetal action through the openings 6, where the hypo-laden water in striking the wings 20 will be drawn or deflected into and upwardly within the trap to discharge into the sink or drain. The spray pipe furnishes a constantly changing supply of fresh water in the tub, and by controlling the volume of water delivered, and the pressure of the spray, the height of the water in the tub can be regulated for large or small numbers of prints, in addition to the adjustment of the sleeve or gage 16. The inside of the tub is smooth and there are no obstructions at the water trap outlet for prints to lodge against or to be torn, and as the action of the water keeps them constantly separated and in motion, they require no further attention from the operator during the operation. It has been found in practice that this machine cleans the prints in a comparatively short time, and as soon as this occurs they are removed from the washer for drying.

The sleeve or gage 16 is of value in the washer, for accomplishing adjustments to regulate the quantity of water in the tub. Thus, when washing a large number of prints at one time, the sleeve is pushed down to a point nearly to the bottom of the tub. This will raise the depth of the water in the tub to the proper height, owing to the restricted discharge of the water, and by turning on the water at the proper speed, the water level will rise within the tub to the desired height as determined by the position of the sleeve. When washing a small number of prints, this sleeve or gage is raised up so that the openings 6 are open fully, thereby enabling the water to discharge more freely into the trap, and keeping the water level down. At the same time, the supply of water can be diminished. Thus, the greater number of prints to be washed, the farther down the sleeve 16 is set, and for a maximum volume, the sleeve can be pushed down against the bottom of the tub, thus shutting off the discharge, excepting the small amount which leaks underneath the sleeve. It will of course be understood that the more the discharge of water is restricted, the greater will be the height of the water within the tub, and this will proportionately increase the pressure of the water where it discharges, so that with a restricted outlet of the water the pressure thereof is increased and the volume of discharge maintained proportionally under the various conditions.

Having thus described the invention, what is claimed as new is:—

1. A washer comprising a tub having a central water trap outlet, and a spray pipe for discharging water downwardly at an angle into the tub for giving the water a whirling motion therein.

2. A washer comprising a tub having a central upstanding water trap outlet, and a spray pipe supported on said trap for discharging water into the tub at an angle to give the water a whirling motion.

3. A washer comprising a tub having a central water trap outlet within the tub including a casing upstanding from the bottom thereof, and a diametrical spray pipe seated on said casing and extending to opposite sides for delivering the water downwardly at an angle into the tub for giving the water a whirling motion therein.

4. A washer comprising a tub, a water trap outlet at the center thereof including a casing upstanding from the bottom of the tub and provided with notches at its upper ends, and a diametrical spray pipe seated in said notches and having oppositely extending arms provided with water outlets, such spray pipe having means between said arms for the connection of a hose.

5. A washer comprising a tub having a central outlet, and a water spray pipe extending from the center of the tub to the rim thereof, and having discharge apertures at spaced points for delivering streams of water downwardly at an angle into the tub, and having at its outer end a slit to provide a sheet or wide stream of water for increased agitation of the water adjacent to the walls of the tub.

6. A washer comprising a tub having a central upstanding outlet member, an upstanding casing surrounding said member and having a water outlet opening at the lower end thereof at one side of said member, means for delivering water into said tub to give it a whirling motion, said casing and member forming a water outlet trap for the discharge of water through said opening upwardly over and down through said member, and means for controlling the flow through said opening to restrict the flow closer to the bottom of the tub or farther up as desired.

7. A washer comprising a tub having a central upstanding water outlet member, a casing surrounding said member and upstanding from the bottom thereof, said casing having a water outlet opening at its lower end at one side of said member, said casing and member providing a water outlet trap for the flow of water through said opening upwardly over and down through said member, means for delivering water into said tub to give it a whirling motion around said casing, and a sleeve slidable on the casing above said opening to control the flow therethrough and operable to restrict the flow as close to the bottom of the tub as desired.

8. A washer comprising a tub having a central outlet, a casing surrounding said outlet having an opening, means within the casing behind said opening for deflecting the water inwardly, and means for spraying the water into the tub to give it a whirling motion therein.

9. A washer comprising a tub having a central outlet, a casing surrounding the outlet and having an opening, means for deflecting the water within the casing from said opening to pass through the outlet, means controlling the flow of water through said opening, and means for spraying water into the tub to give it a whirling motion therein.

10. A washer comprising a tub having a central upstanding outlet member, a casing surrounding said member and having an opening, said member and casing providing a water outlet trap, means between said opening and member for deflecting water inwardly and upwardly from said opening to pass downwardly through said member, and means for spraying water into the tub to give it a whirling motion therein.

11. A washer according to claim 10 and also having in combination a sleeve slidable on the casing and controlling said opening.

12. A washer comprising a tub having a central upstanding water outlet member, a casing upstanding from the bottom of the tub and surrounding said member, said casing having lower openings and forming a water trap with said member, and a water deflector within the casing around said member including a band and deflecting wings carried thereby and arranged to deflect water from said openings inwardly and upwardly to pass downwardly through said member.

13. A washer according to claim 12 and also having in combination a water controlling sleeve slidable on the casing to control the flow of water through said openings.

14. A washer comprising a tub having a central water outlet member upstanding from its bottom, a casing upstanding from the bottom of the tub and surrounding said member, said casing having openings at its lower end and forming a water trap with said member, a screen fitted within said casing across said openings, a water deflector comprising a band fitted on said member and deflecting wings carried by said band and arranged with respect to said openings for catching the water therefrom and deflecting it inwardly and upwardly over said member, a water gage sleeve slidable on said casing above said openings to control the flow of water therethrough, and means for spraying water into the tub to give it a whirling motion therein.

In testimony whereof I have signed my name to this specification in the presence of two subscribing witnesses.

WILLIAM A. LENZ.

Witnesses:
I. T. CURRY,
F. J. DEMUTH.

Copies of this patent may be obtained for five cents each, by addressing the "Commissioner of Patents, Washington, D. C."